United States Patent

Nishioka et al.

Patent Number: 6,012,541
Date of Patent: Jan. 11, 2000

[54] OPERATIONAL FAILURE DETECTING SYSTEM FOR HYDRAULICALLY CONTROLLED POWER STEERING SYSTEM

[75] Inventors: Futoshi Nishioka; Kenji Umayahara, both of Hiroshima, Japan

[73] Assignee: Mazda Motor Corporation, Hiroshima-ken, Japan

[21] Appl. No.: 08/980,252

[22] Filed: Nov. 28, 1997

[30] Foreign Application Priority Data

Nov. 29, 1996 [JP] Japan .................................. 8-319090

[51] Int. Cl.⁷ .................................................. B62D 5/30
[52] U.S. Cl. .......................... 180/404; 180/422; 701/43
[58] Field of Search .................................. 180/404, 405, 180/406, 407, 421, 422; 701/43; 73/1.01, 1.57, 1.63

[56] References Cited

U.S. PATENT DOCUMENTS

| | | | |
|---|---|---|---|
| 4,566,309 | 1/1986 | Van Belzen et al. | 73/1.57 |
| 4,903,208 | 2/1990 | Murai et al. | 701/43 |
| 5,008,823 | 4/1991 | Takahashi | 180/404 |
| 5,020,617 | 6/1991 | Oshita et al. | 180/404 |
| 5,048,627 | 9/1991 | Eguchi et al. | 180/404 |
| 5,065,325 | 11/1991 | Takahashi | 180/404 |
| 5,082,076 | 1/1992 | Oshita et al. | 180/404 |
| 5,313,389 | 5/1994 | Yasui | 180/404 |
| 5,457,631 | 10/1995 | Momose | 701/43 |
| 5,714,673 | 2/1998 | Bidner et al. | 73/1.57 |

FOREIGN PATENT DOCUMENTS

| | | | |
|---|---|---|---|
| 60-91230 | 5/1985 | Japan | 73/1.57 |
| 4-59483 | 2/1992 | Japan | B26D 6/00 |

Primary Examiner—Lanna Mai
Assistant Examiner—Andrew J. Fischer
Attorney, Agent, or Firm—Hugh A. Abrams; Sidley & Austin

[57] ABSTRACT

A failure detection system for detecting an operational failure of a rack and pinion type of hydraulically controlled power steering system which employs a power cylinder to assist the driver in manipulating front wheels of the vehicle by utilizing hydraulic pressure applied to a steering gear connected to the front wheels utilizes a pressure switch for detecting a specified level of oil pressure provided by the power cylinder to be at operational failure when the vehicle speed remains higher than a specified speed for a specified time period, the pressure switch detects the specified level of hydraulic pressure.

22 Claims, 9 Drawing Sheets

OPERATIONAL FAILURE DETECTING SYSTEM FOR HYDRAULICALLY CONTROLLED POWER STEERING SYSTEM

BACKGROUND OF THE INVENTION

1. Field of the Invention

This invention relates to a system for detecting an operational failure of a rack and pinion type of hydraulically controlled power steering system installed in a motor vehicle, and, more particularly, to an operational failure detecting system for detecting an operational failure of a device which detects an operating condition of a rack and pinion type of hydraulically controlled power steering system on a basis of a rise in hydraulic pressure and which is utilized to assist the driver in manipulating front wheels of the vehicle.

2. Description of the Related Art

Hydraulically controlled power steering systems have been well known and widely installed to motor vehicles. Such a hydraulically controlled power steering system employs a power cylinder and a control valve provides a power assist. The power cylinder has a piston formed as an integral part of a rack of a rack and pinion steering gear, and the control valve is disposed in a hydraulic control circuit between the power cylinder and a power steering pump driven directly by an engine. Turning of a steering wheel, either the right or left, actuates the control valve to transmit and increase hydraulic oil pressure in one of right and left turn power chambers or the other of the power cylinder, so as thereby to reduce the driver's wheel turning effort, and hence to assist the driver in manipulating the steering the front wheels. An example of such a hydraulically controlled power steering systems can be found in Japanese Unexamined Patent Publication No. 4-59483.

It has been well known to those skilled in the automobile art to utilize engine speed feedback control such that the engine attains a desired or target speed of rotation during idling. Typically, when the engine is to drive various pieces of equipment as engine loads, such as the power steering pump for generating hydraulic pressure for the power assist, an alternator, a compressor for an air conditioner and the like, while running idle, the engine speed is increased with the effect of decreasing the effect of the load on the engine, avoiding a halt of the engine and increasing efficiency of the equipment. For this reason, in cases where a self-diagnosis is executed to detect whether the idle speed control is properly performed, a pressure sensor or a pressure switch is used to detect an increase in hydraulic oil pressure to a specified level prescribed for a determination on the operation of the hydraulically controlled power steering system and avoid execution of the diagnosis of failure of the idle speed control system while the hydraulically controlled power steering system is working as a load on the engine.

The pressure switch is comprised of, for instance, a pressure level plate and an elastically deformable member, such as a coil spring, for urging the pressure level plate against the pressure head. When the pressure level plate is forced against the spring by a specified level of pressure, it provide an electric signal in response to development of the specified level of pressure. Another type of pressure switch employs a diaphragm which is elastically deformable to provide an electric signal in response to development of the specified level of pressure.

In these pressure switches, operational failures occur due to entrapment of the spring or the diaphragm, or a lock of the pressure level plate caused by foreign particles, which always results in inaccurate detection of the specified level of pressure. For example, even though the hydraulically controlled power steering system is at rest without a rise in pressure level, it is possible to conclude that the hydraulically controlled power steering system is working, which results from wrong detection of the pressure level. In such cases, rest of the hydraulically controlled power steering system, which is one of the condition of execution of the diagnosis of operational failure of the idle speed control system, is not detected for a long time, resulting in interruption of the diagnosis of operational failure of the idle speed control system.

SUMMARY OF THE INVENTION

It is an objective of the present invention to provide a system for detecting an operational failure of a rack and pinion type of hydraulically controlled power steering system in which the condition of precise determination of failures of a pressure detecting means which detects a rise in level of pressure applied to the hydraulically controlled power steering system is established suitably in order to avoid the wrong detection of the pressure level and adverse effects from the wrong detection.

The foregoing object of the present invention is achieved by determining that, in the event where the vehicle is practically traveling under driving conditions without power assist, a pressure detection means detects a rise to a specified level of hydraulic pressure which is usually caused by operation of the hydraulically controlled power steering system with the power assist, the detection of a rise in level of hydraulic pressure is an error resulting from an operational failure of the pressure detection means. The driving condition may be set forth so that the vehicle is traveling at a high speed for a specified time period, that an angular velocity of steering remains for a specified time period, or that the torque of rotation of the steering wheel occurs for a specified time period.

Specifically, the system for detecting an operational failure of the hydraulically controlled power steering system includes a power assisting means for assisting the driver in manipulating front wheels of the vehicle by utilizing hydraulic pressure applied, for example, to the steering gear connected to the front wheels through a steering linkage and increased in response to an increase in resistance against manipulation of the steering gear, and comprises a pressure detecting means to detect a specified level of the hydraulic pressure developed by the power assisting means and a failure judging means to determine if the pressure detecting means failed in operation while the vehicle speed remains higher than a specified speed for a specified time period, and the pressure detecting means detects the specified level of hydraulic pressure.

With the hydraulically controlled power steering system, in the event that the vehicle is traveling at a speed higher than a specified critical speed over a specified time period, the pressure detecting means detects the hydraulic pressure developed by the power assisting means which remains higher than the specified level, because on practical driving conditions the power assisting means is not actuated and does not provide the power assist under those conditions, it is concluded that the pressure detecting means encounters a somewhat serious failure. Accordingly, the failure detection system avoids wrong detection such that, though the power assisting means is practically not working, and hence developing no rise in the hydraulic pressure, the pressure detecting means provides an indication that the power assist is provided, so that an accurate detection of operational failures of the pressure detecting means is assured.

In cases where the diagnosis of failure of the idle speed control means is executed while the pressure detecting means indicates that the hydraulic pressure developed by the power assisting means is low, it is immediately and precisely found that the diagnosis of failure of the idle speed control is ineffective due to a failure of the pressure detecting means. The power assisting means applies hydraulic pressure to the steering gear while the hydraulically controlled power steering system is manipulated. This enables the precise determination of failures of a pressure detecting means which detects a rise in level of pressure applied to the hydraulically controlled power steering system suitable for accurate detection of failure of the pressure detecting means.

The pressure detecting means may comprise an elastic member, deformable in response to a rise in the hydraulic pressure developed to the specified level by the power assisting means, with an effect of accurate detection of failures even if it is of a type which is easy to cause errors in failure detection as described above.

In accordance with another embodiment of the invention, the failure detection system determines that the pressure detecting means is at failure if the vehicle speed remains higher than the specified speed for a specified time period, the pressure detecting means detects the specified level of hydraulic pressure, and executes the diagnosis of an operational failure of the idle speed control means by utilizing a threshold value relating to engine speed when, while judging a failure of the pressure detecting means, the vehicle speed remains higher than the specified speed for a specified time period. The threshold value is increased when a prescribed condition is satisfied. The prescribed condition may be specified so that the angle of turn of the steering wheel is 0 (zero), that the torque of rotation of the steering wheel remains 0 (zero), or that the vehicle speed remains higher than a specified speed for a specified time period.

With the failure detection system, the diagnosis of an operational failure of the idle speed control means is interrupted when the pressure detecting means detects the hydraulic pressure remaining higher than the specified level. In the event where, although the pressure detecting means is at failure in operation and there is practically no presence of a rise in hydraulic pressure, it detects a rise in hydraulic pressure to the specified level, the diagnosis of an operational failure of the idle speed control means is interrupted until the cause of failure is cleared. However, with the failure detection system of this embodiment, the determination of a failure of the pressure detecting means is accurate, so that, even in the event of detection of a rise in hydraulic pressure to the specified level although the pressure sensor is at failure in operation, the diagnosis of an operational failure of the idle speed control means is executed. By specifying the rest states of the power assisting means which is the condition of execution of the diagnosis of an operational failure of the idle speed control means, the detection of an operational failure of the idle speed control means is executed in spite of an occurrence of an error of the pressure detecting means.

In accordance with another embodiment of the invention, the failure detection system calculates the change in the angular velocity of turn of the steering wheel or front wheels and judges the pressure detecting means to be at failure in operation when the change in the angular velocity of turn remains zero, the pressure detecting means detects the hydraulic pressure remaining higher than a specified level for a specified time period.

With the failure detection system, where there is no change in angular velocity of turn of the steering wheel, the pressure detecting means detects a rise in hydraulic pressure to the specified level for a specified time period, because it can not occur on practical driving conditions that the power assisting means works and provides the power assist with the steering wheel remaining not operated, it is concluded that the pressure detecting means failed. Accordingly, the failure detection system assures accurate detection of an operational failure of the pressure detecting means and prevents the pressure detecting means from providing in error an indication of actuation of the power assisting means.

In accordance with still another embodiment of the invention, the failure detection system determines if the pressure detecting means to be at failure in operation when no torque of rotation of the steering wheel is detected, the pressure detecting means detects the hydraulic pressure remaining higher than a specified level for a specified time period.

With the failure detecting system, where while there is no torque of turn of the steering wheel, the pressure detecting means detects the hydraulic pressure remaining higher than a specified level for a specified time period, because it can not occur on practical driving conditions that the power assisting means works and provides the power assist with the steering wheel or front wheels remaining subjected to no torque of rotation, it is concluded that the pressure detecting means encounters an operational failure. Accordingly, the failure detection system assures accurate detection of an operational failure of the pressure detecting means and prevents the pressure detecting means from providing in error an indication of actuation of the assisting means.

The failure detecting systems described above may be used to determine the operational failure of the pressure detecting means on conditions that the temperature of engine cooling water is higher than a specified temperature.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
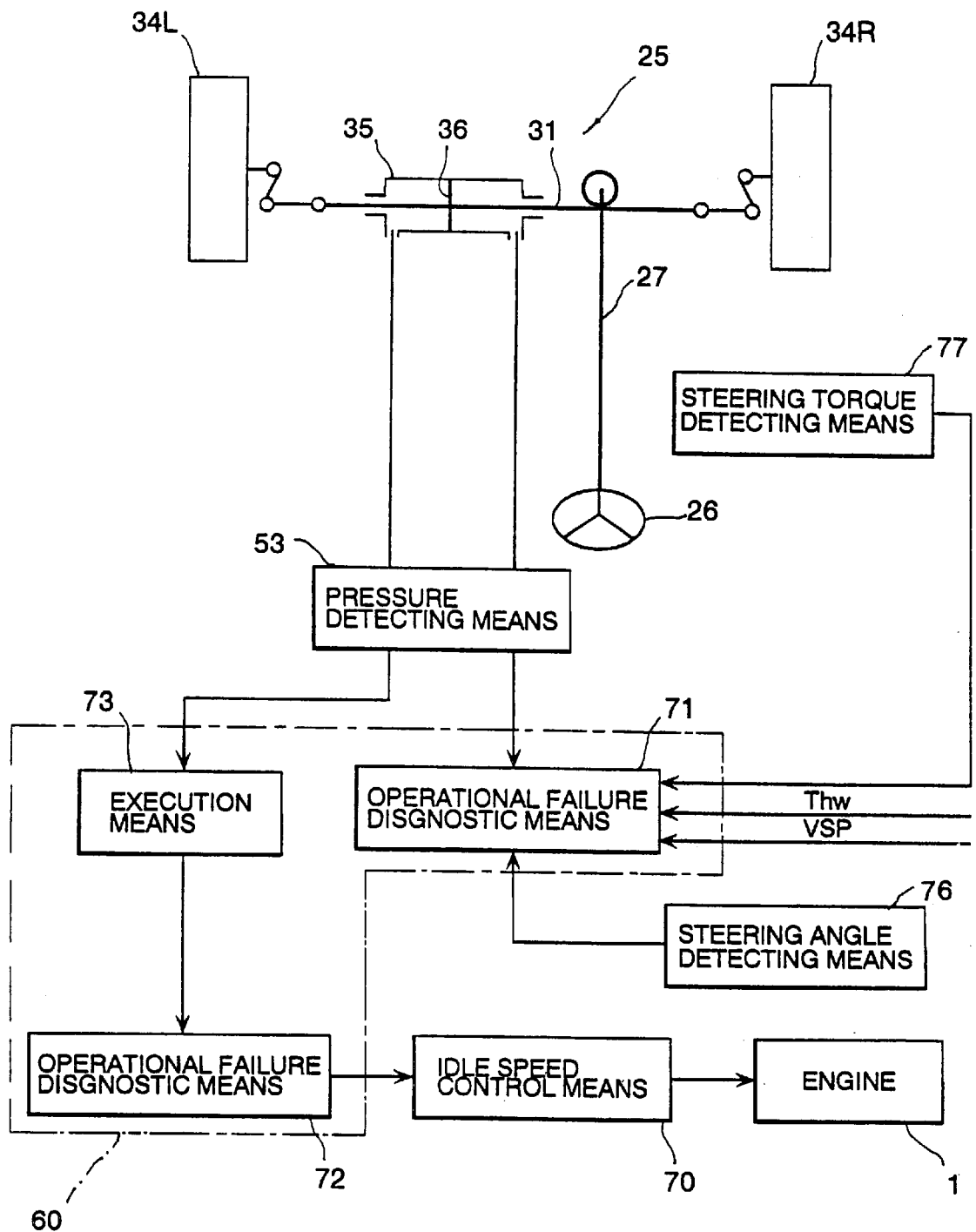
FIG. 1 is a schematic illustration, partly in block, of the motor vehicle provided with a failure detection system for detecting an operational failure of a rack and pinion type of hydraulically controlled power steering system in accordance with an embodiment of the invention.

Referring to the drawings in detail, in particular, to FIG. 1 which schematically shows a functional structure of the failure detection system of a rack and pinion type of hydraulically controlled power steering system for the purpose of providing an understanding of the general idea of the invention. The rack and pinion type of hydraulically controlled power steering system 25 employs a power cylinder 35 forming part of a power assisting means for assisting movement of steering gear connected to right and left front wheels 34R and 34L through steering linkage, either to the right or left, which takes a form of power cylinder 35. A piston 36 formed as integral part of the rack 31 can slides in the cylinder 35 to provide right and left turn power chambers in the cylinder 35. Hydraulic pressure developed in each of the right and left power chambers is detected by a pressure detecting means 53. A failure judging means 71, which is a function programmed for the control unit 60, determines if the pressure detecting means 53 is at failure in operation when the vehicle speed VSP remains higher than a specified speed for a specified time period, the pressure detecting means 53 detects the specified level of hydraulic pressure. To make this determination the temperature of engine cooling water THW may be read. That is, the failure detecting means 71 is permitted to execute the judgement of an operational failure of the pressure detecting means 53 on condition that the temperature of engine cooling water is higher than a specified temperature.

An idle speed control system 70, which includes an idle speed control valve and a function forming part of the control unit 60, performs the feedback control of engine speed while the engine 1 runs idle. An execution means 73, which is a function programmed for the control unit 60, allows a failure judging means 72 to determine an operational failure of the idle speed control system 70 when the failure judging means 71 determines that the pressure detecting means 53 is at failure in operation, the pressure detecting means 53 detects the specified level of hydraulic pressure.

The failure judging means 71 may determine an operational failure of the pressure detecting means 53 by utilizing the angle of turn of the steering wheel or front wheels which is detected by a steering angle detecting means 76. The failure detecting means 71 calculates a change in the angular velocity of steering and determines that the pressure detecting means 53 to be at failure when no change in angular velocity is detected, the pressure detecting means 53 detects the hydraulic pressure remaining higher than a specified level for a specified time period. The utilization may be made of a torque detection means 77 to detect the torque of rotation of the steering wheel in place of the a steering angle detecting means 76. That is, the failure detection means 71 determines that the pressure detecting means to be at failure in operation when no torque of rotation of the steering wheel is detected, and the pressure detecting means 53 detects the hydraulic pressure remaining higher than a specified level for a specified time period.

Figure 4:
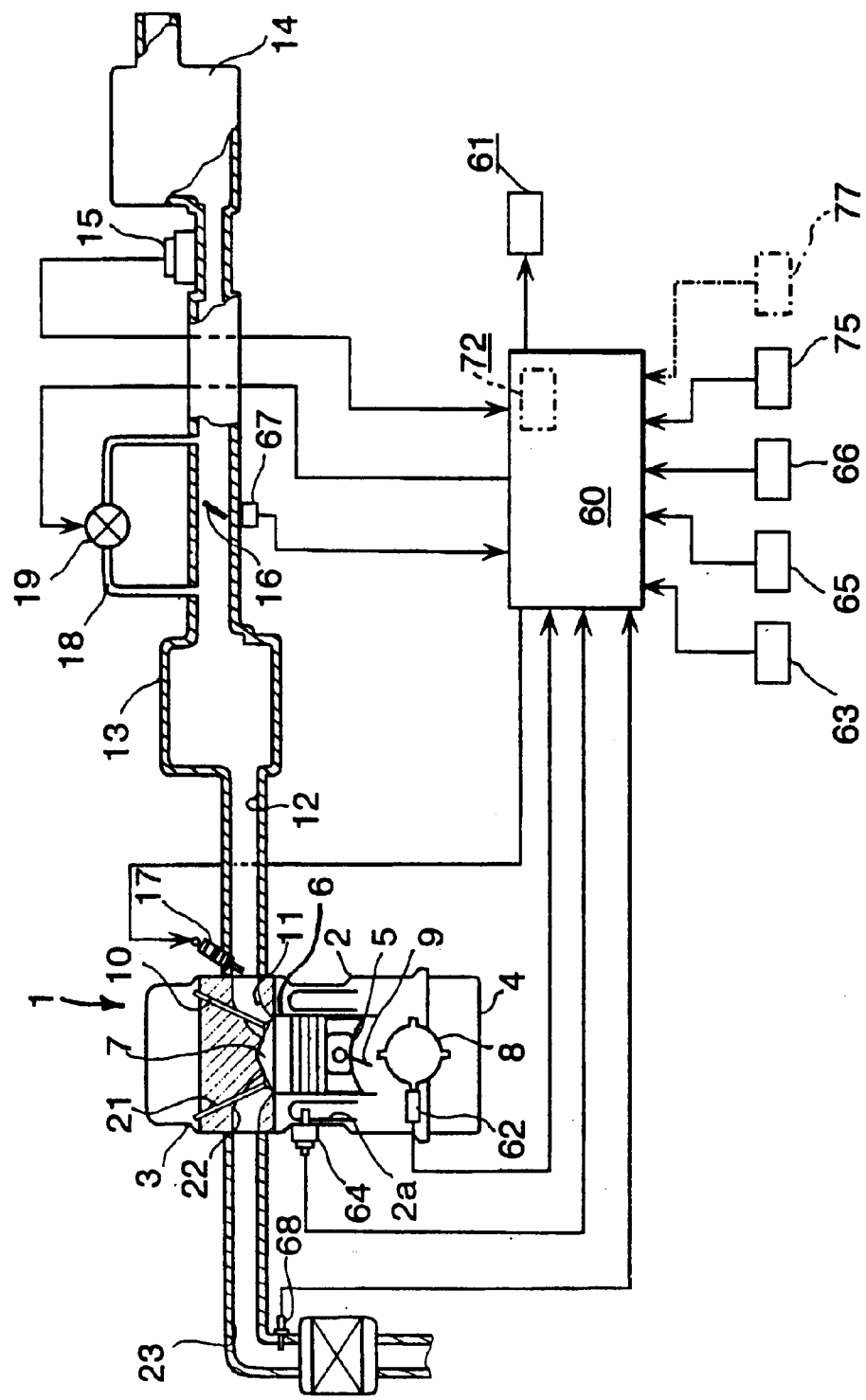
FIG. 4 is a schematic illustration of intake and exhaust systems of an engine of the motor vehicle.

Referring now to FIG. 4 showing an intake system and an exhaust system of an engine 1 installed in a motor vehicle, this engine 1 comprises a cylinder block 2 and a cylinder head 3 mounted on the cylinder block 2. The cylinder block 2 is provided with cylinder bores 6 (only one of which is shown) in which pistons 5 can slide. Combustion chambers 7 are formed in the cylinders by the top of the pistons 5, a lower wall of the cylinder head 3 and the cylinder bores 6. A crankcase 4 surrounds a crankshaft 8 connected to the pistons 5 by means of connecting rods 9 and is attached to the cylinder block 2. Each of the cylinders 6 is formed with an intake port 11 and an exhaust port 22 opening into the combustion chambers 7, respectively. The intake port 11 and the exhaust port 22 are opened and shut at a predetermined timing by an intake valve 10 and an exhaust valve 21, respectively.

Intake air is introduced into the cylinder 6 through an intake passage 12 having a surge tank 13. The intake passage 12 is provided, at the upstream end, with an air cleaner 14, a heat wire type of air-flow meter or sensor 15, a throttle valve 16 and a fuel injector 17 which is disposed downstream from the surge tank 13 and in close proximity to the intake port 11. The intake passage 12 has a bypass passage 18 branching off therefrom upstream from the throttle valve 16 and joining thereto between the throttle valve 16 and the surge tank 13 to bypass the throttle valve 16. An idle speed control valve 19 forming a part of the idle speed control system is variably opened and closed by an actuator (not shown) to permit intake air to flow through the bypass passage 18. While the engine 1 runs idle with the throttle valve 16 fully closed, the idle speed control valve 19 is opened to regulate the amount of intake air passing through the bypass passage 18 so as to control the rotational speed of the engine 1.

Figure 6:
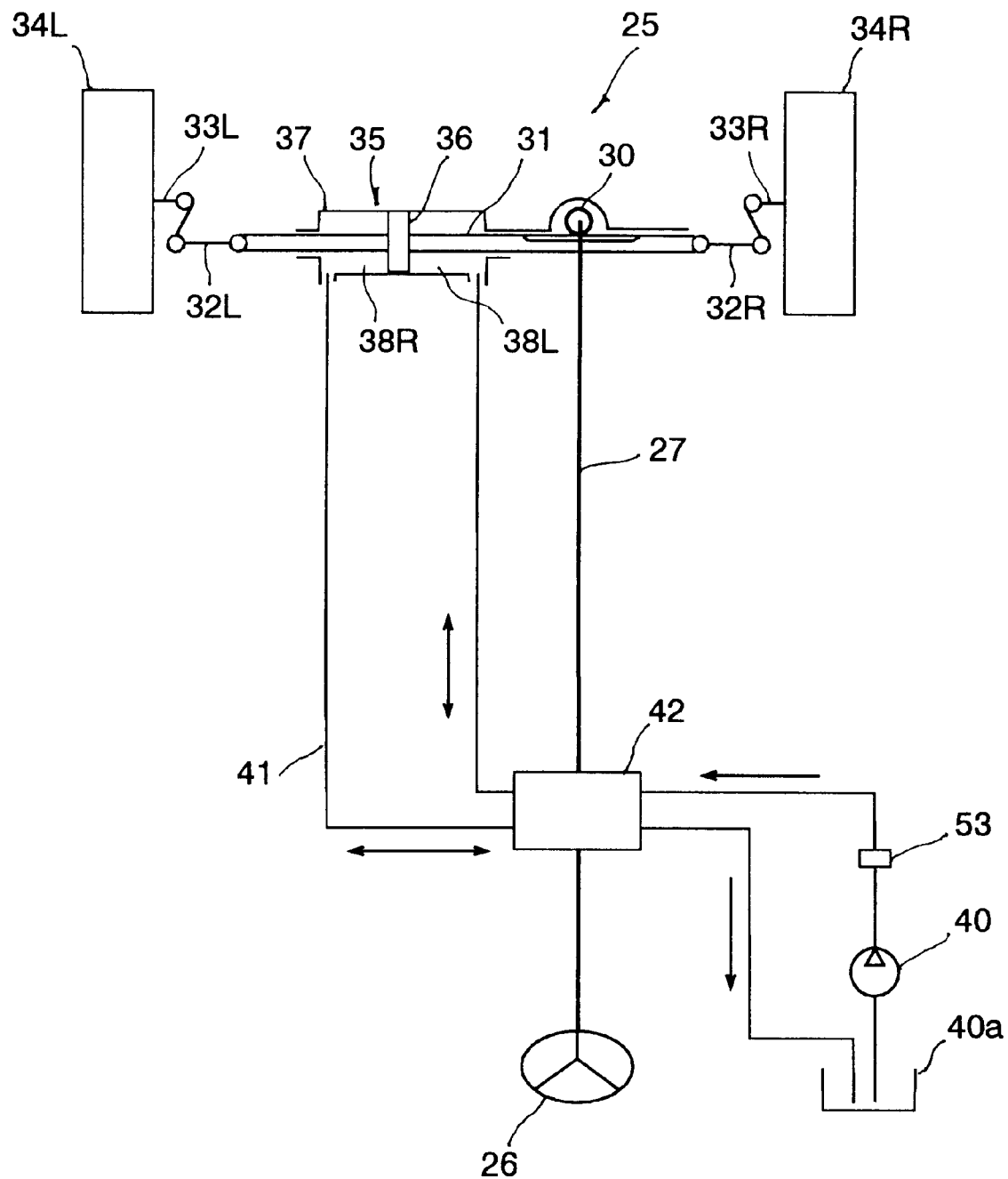
FIG. 6 is an schematic illustration of the rack and pinion type of hydraulically controlled power steering system.

FIG. 6 shows a rack and pinion type of hydraulically controlled power steering system incorporating a rack and pinion steering gear 25 for transferring motion of a steering wheel 26 to right and left front wheels 34R and 34L. The rack and pinion steering gear includes a steering shaft 27 consisting of a long steel shaft supported for rotation by an integral part of the vehicle body (not shown). This steering shaft 27 has a steering wheel 16 on one end and fastens to a pinion shaft universal joint (not shown) on the other. This pinion shaft universal joint is fastened to a rack and pinion steering gearbox consisting of a pinion shaft 30 and a rack 31 extending between the right and left front wheels 34R and 34L which are in mesh with each other. The ends of the rack are connected to steering knuckle arms 33L and 33R for the front wheels 34L and 34R by tie rods 32L and 32R, respectively. When the steering wheel 26, and hence the pinion shaft 30, is turned, it forces the rack 31 to move, either to the right or left. All gear rack movement is transferred directly to the steering knuckle arms, moving the front wheels 34L and 34R to the right or left. The rack and pinion steering system 25, which is designed and adapted to assist or increase the driver's turning effort by utilizing hydraulic pressure to bolster or strengthen normal torque developed by the steering gear, employs a power cylinder 35 and a control valve 42, in the form of a rotary valve, to provide a power assist.

Figure 5:
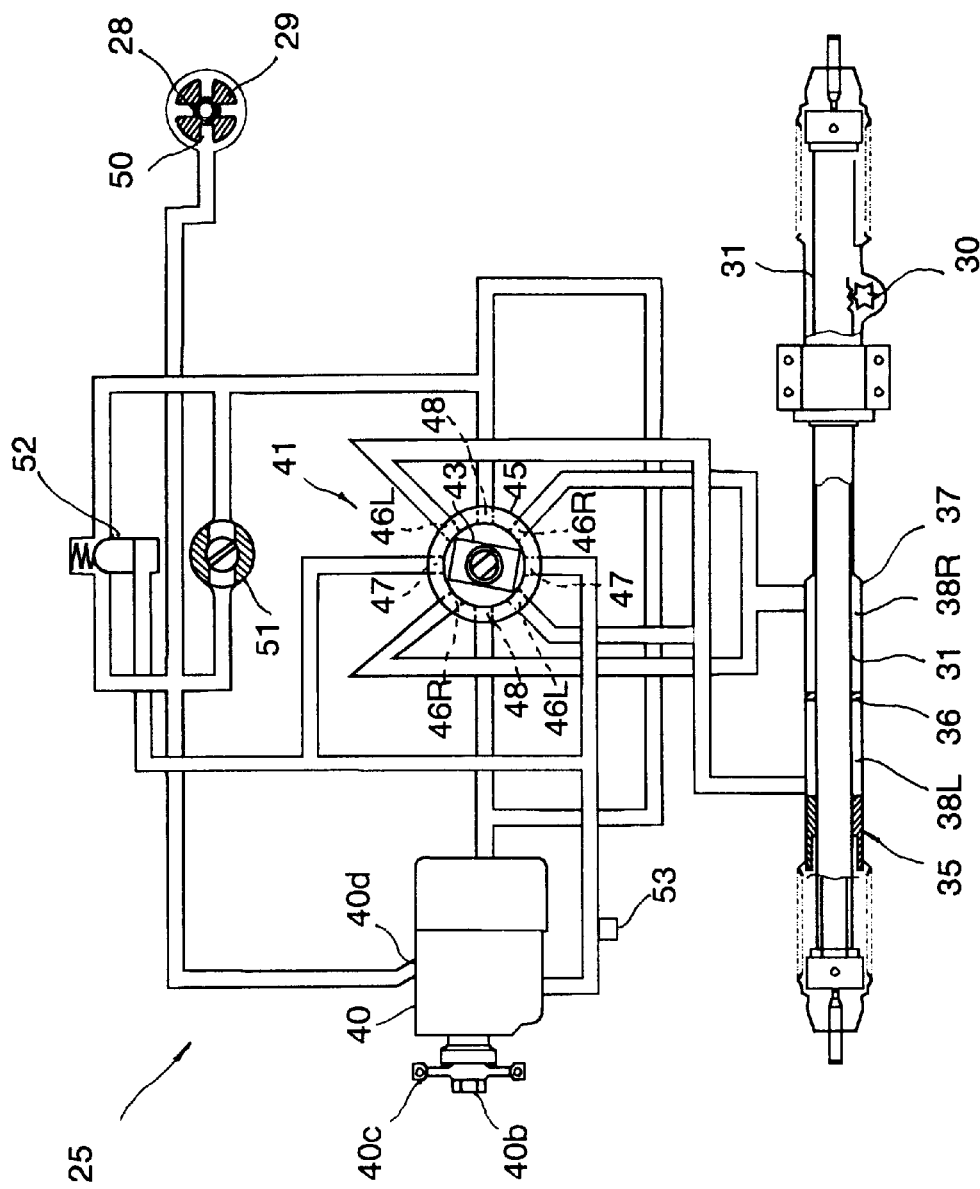
FIG. 5 is a hydraulic control circuit forming one of essential parts of the rack and pinion type of hydraulically controlled power steering system.

As shown in detail in FIG. 5, the power cylinder 35 has a power piston 36 formed as an integral part of the rack 31 and a cylinder housing 37 secured to an integral part of the vehicle body and surrounding a piston rod forming part of the rack 31. The power cylinder 35 provides hydraulic pressure or power chambers, namely right and left turn power chambers 38R and 38L, on opposite sides of the power piston 36 in the cylinder housing 37. Applying hydraulic pressure, either in the left turn power chamber 38L or right turn power chamber 38R, strengthens normal torque developed by the steering gear to assist driver's wheel turning effort. The power cylinder 35 at both of its power chambers is connected to a power steering pump 40 through a hydraulic control circuit 41 including a reservoir 40a (see FIG. 6) from which pressurized oil flows down and into which the returned hydraulic oil is forced. This power steering pump 40 has a V-shaped pulley 40c attached to one end of a rotary shaft 40b and is belt driven by the engine 1. A reaction power chamber 50 multiplies hydraulic oil pressure discharged from a sub-pump (not shown) built in the power steering pump 40 through a discharge port 40d when the engine 1 is operating at a high speed. The hydraulic oil pressure, which is varied by means of a stepping valve 51 and a pressure responsive valve 52, presses a lower shaft 29 (which will be described later) at its lower end against a torsion bar 28 (which will be described later) to regulate the steering power.

Figure 7:
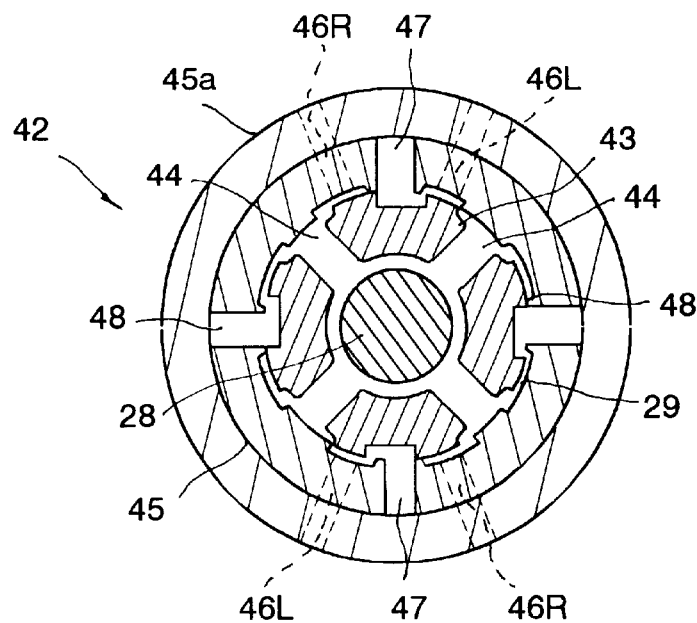
FIG. 7 is an enlarged view showing an internal structure of a control valve of the rack and pinion type of hydraulically controlled power steering system.

As shown in detail in FIG. 7, the control valve 42 is disposed in the hydraulic control circuit 41 between the power cylinder 35 and the power steering pump 40 and mounted on the steering shaft 27 so that turning of the steering wheel 26, either to the right or left, actuates the control valve 42 to transmit hydraulic oil pressure to one pressure chamber or the other of the power cylinder 35. Specifically, the steering shaft 27 has an intermediate section formed as a torsion bar 28 capable of being slightly distorted with respect to an axis of the steering shaft 27. A cylindrical sleeve 29 is coaxially mounted as a valve shaft on and secured to an upper section of the steering shaft 27 between the torsion bar 28 and the steering wheel 26 and extends downward to overlap the torsion bar 28. The control valve 42 is comprised of a cylindrical valve spool 43 formed as an intermediate integral part of the valve shaft 29 and a cylindrical valve body 45 encased in a sealing shell 45a formed with connectors to the power steering pump 40 and the power cylinder 30 and mounted on the valve shaft 29 so as to enclose air-tightly both torsion bar 28 and valve shaft 29. This valve body 45 is formed with a pair of right turn holes 46R always in communication with the right turn power chamber 38R of the power cylinder 35, a pair of left turn holes 46L always in communication with the left turn power chamber 38L of the power cylinder 35, a pair of high pressure slots 47 always in communication with the power steering pump 40 on the discharge side or on the side remote from the reservoir 40a, and a pair of low pressure slots 48 always in communication with the power steering pump 40 on the drawing side or on the side of the reservoir 40a, each pair of slots or holes being arranged in diametrically opposite positions. In particular, the high and low pressure slots 47 and 48 are alternately arranged at regular angular separations. The valve spool 43 is formed with four return holes 44 arranged at regular angular separations. Turning of the steering wheel 26 to the left from the neutral position forces the control valve 42, in particular the valve spool 43, in one direction to bring the high pressure slots 47 into communication with the left turn holes 46L, respectively, and simultaneously brings the low pressure slots 48 and into communication with the right turn holes 46L, respectively, with the result of developing a higher pressure in the left turn power chamber 38L of the power cylinder 35 than in the right turn power chamber 38R, so as thereby to assist movement of the rack 31 to the left. Similarly, turning of the steering wheel 26 to the right from the neutral position forces the valve spool 43 in the other direction to bring the high pressure slots 47 into communication with the right turn holes 46R, respectively, and simultaneously brings the low pressure slots 48 into communication with the left turn holes 46L, respectively, as shown in FIG. 7, with the result of developing a higher pressure in the right turn power chamber 38R of the power cylinder 35 than in the left turn power chamber 38L, so as thereby to assist movement of the rack 31 to the right. When the steering wheel 26 is at rest or at a steering angle of 0 (zero) so as to direct the front wheels 34R and 34L straight ahead, in other words, the steering system is free from any load, the control valve 42 brings the high pressure slots 47 into communication with the low pressure slots 48, respectively, so as to allow the hydraulic oil to return into the reservoir 40a.

Figure 8:
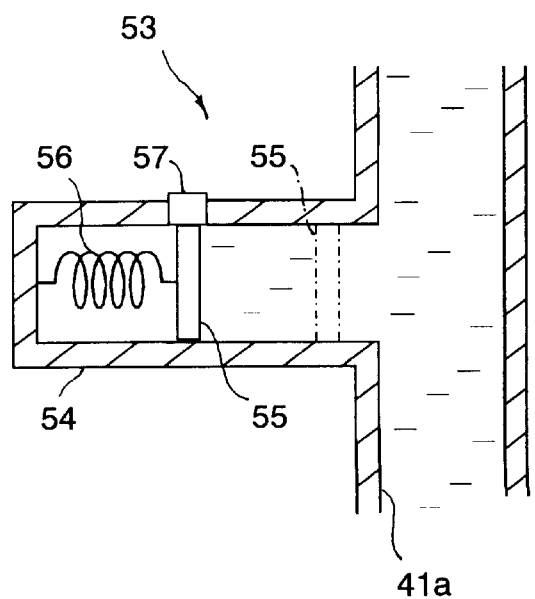
FIG. 8 is a view showing a structure of the rack and pinion type of hydraulically controlled power steering switch.

The rack and pinion steering system 25 further employs a power steering (PST) switch 53, in the form of a pressure switch, disposed in the hydraulic control circuit 41 between the discharge side of the power steering pump 40 and the control valve 42 such as shown in detail in FIG. 8.

As shown in FIG. 8, the power steering (PST) switch 53 comprises a cylinder 54 opening into an oil passage 41a of the hydraulic control circuit 41, a pressure level plate 55 capable of sliding in the cylinder 54 and an elastically deformable member such as a coil spring 56 forcing the pressure level plate 55 against pressurized oil. The power steering (PST) switch 53 is provided with an electric switch 57 which is turned on by the pressure level plate 55 to provide an electric signal. The coil spring 56 is designed so that the pressure level plate 55 is forced to the position where it turns on the electric switch 57 when receiving a specified level of hydraulic pressure developed as a result of manipulation of the steering wheel 26, either to the right or left.

Referring back to FIG. 4, a control unit 60 mainly comprising a microcomputer controls various elements including the fuel injector 17, the idle speed control valve 19 and an indicator 61 such as a lamp on an instrument panel for providing an indication of operational failures of the hydraulically controlled power steering system and the idle speed control system, and receives various signals from sensors and switches including, in addition to the air-flow sensor 15 and the power steering (PST) switch 53, a speed sensor 62 which detects the rotational speed of the crankshaft 8 of the engine 1 as engine speed Ne, a speed sensor 63 for detecting the traveling speed of vehicle VSP, a temperature sensor 64 for detecting the water temperature THW of engine cooling water circulating in the water jacket 2a of the cylinder block 2 of the engine 1, an air conditioner switch 65, a brake switch 66 which is turned on in response to applying brakes, an idle switch 67 which is turned on in response to closing the throttle valve 16, an oxygen ($O_2$) sensor 68 for detecting the density of oxygen in the exhaust gas, an angle sensor 75 for detecting the angle of turn (which is referred to as steering angle) β of the steering wheel 26, and a rotational torque sensor 77 for detecting the rotational torque of steering shaft 27. All these sensors and switches are known in various forms and may take any well known forms. The control unit 60 comprises a microcomputer programmed to perform idle speed feedback control, failure detection control of the idle speed control system and failure detection control of the power steering system.

Figure 2:
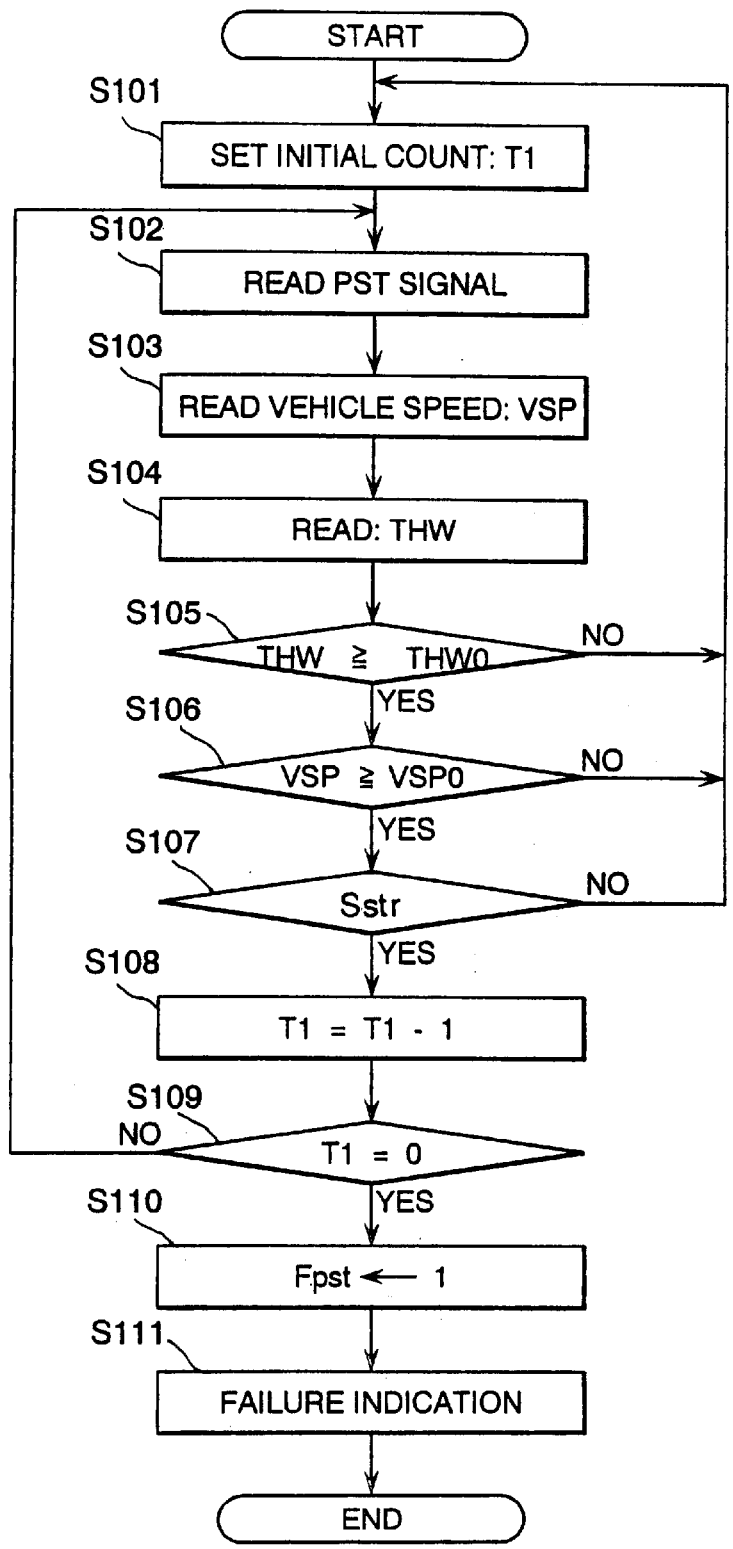
FIG. 2 is a flow chart illustrating the sequence routine of detection control of an operational failure of a power steering switch incorporated as a pressure detecting means in the rack and pinion type of hydraulically controlled power steering system of the motor vehicle shown in FIG. 2.
Figure 3:
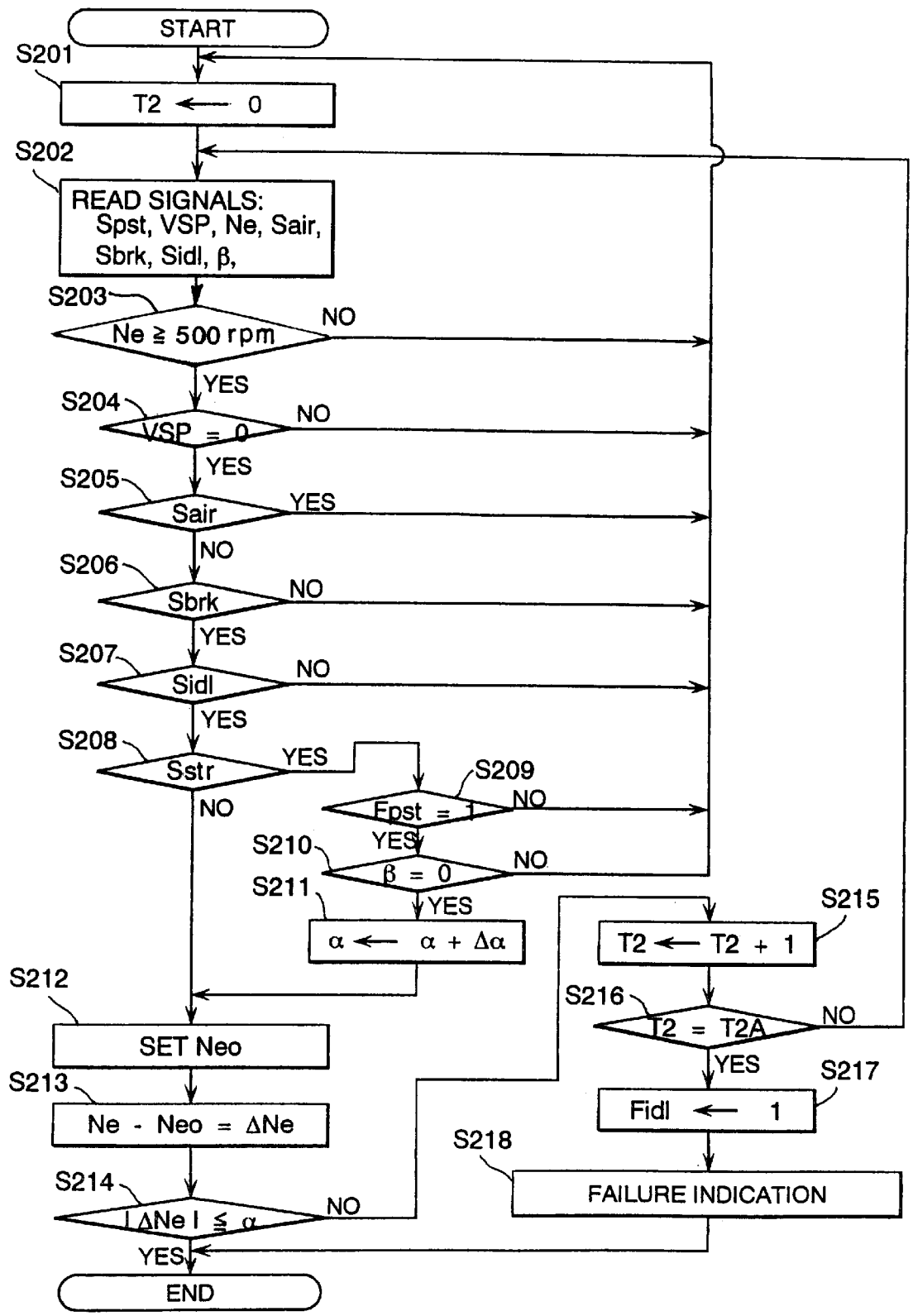
FIG. 3 is a flow chart illustrating the sequence routine of diagnosis of an operational failure of an idle speed control system.

The operation of the failure detection system of the hydraulically controlled power steering system of the invention depicted in FIG. 6 is best understood by reviewing FIGS. 2 and 3, which are flow charts illustrating failure detection sequence routines for the microcomputer.

Referring now to FIG. 2, which is a flow chart of the sequence routine of detection of an operational failure of the power steering (PST) switch 53, the control unit 60 periodically executes the operational failure detection sequence routine at a frequency of, for example, 20 ms. after engine ignition.

When the flow chart logic commences and control proceeds directly to a function block at step S101 where a count-down timer is initialized to reset an initial time T1 to, for instance, 60 seconds. Subsequently, various signals including a signal from the power steering (PST) switch 53, a signal representative of the vehicle speed VSP from the vehicle speed sensor 63 and a signal representative of the temperature of engine cooling water THW from the temperature sensor 64 at steps S102, S103 and S104, respectively are received. The temperature of engine cooling water THW is compared to a specified critical temperature THW0 of, for instance in this embodiment, 60° C. at step S105. When the temperature of engine cooling water THW is lower than 60° C., the flow chart logic orders return to restart the sequence routine from step S101. On the other hand, when the temperature of engine cooling water THW is equal to or higher than 60° C., then, the vehicle speed VSP is compared to a specified critical speed VSP0 of, for instance in this embodiment, 60 km/h at step S106. When the vehicle speed VSP is lower than 60 km/h, the flow chart logic orders return to restart the sequence routine from step S101. On the other hand, when the vehicle speed VSP is equal to or higher than 60 km/h, then, a determination is made at step S107 as to whether there is a steering signal $S_{str}$ from the power steering (PST) switch 53. When no steering signal $S_{str}$ is detected, the flow chart logic orders return to restart the sequence routine from step S101. On the other hand, when a steering signal $S_{str}$ is detected, i.e. the answer to the determination is "YES," this indicates that the pressure level plate 55 of the power steering (PST) switch 53 is forced by a specified level of pressure to the position where it turns on the electric switch 57, then, after counting down the timer count T1 by 1 (one) at step S108, another determination is made at step S109 as to whether the timer count T1 is 0 (zero). What is represented by counting down to 0 (zero) is that turning of the steering wheel 26 is continuously made for 60 seconds which can, however, practically not occur. Accordingly, when the timer count T1 indicates 0 (zero), the power steering (PST) switch 53 is regarded as certainly encountering an operational failure. If the answer to the determination is "YES," after setting a failure flag $F_{PST}$ to a state of "1" which indicates an operational failure of the power steering (PST) switch 53 at step S110, the indicator 61 is actuated to provide an indication of an operational failure of the power steering (PST) switch 53, and hence an operational failure of the power steering system, at step S111 and the flow chart logic terminates the sequence routine. On the other hand, when the answer to the determination is "NO," this indicates that the power steering (PST) switch 53, and hence the hydraulically controlled power steering system, operates normally, then, the flow chart logic orders return to restart the sequence routine from step S102.

Referring to FIG. 3, which is a flow chart of the sequence routine of detection of an operational failure of the idle speed control system. The control unit 60 periodically executes the operational failure detection routine at a frequency of, for example, 20 ms after engine ignition.

When the flow chart logic commences and control proceeds directly to a function block at step S201 where a count-up timer is initialized to reset an initial time T1 to 0 (zero). Subsequently, after reading various signals including a signal from the power steering (PST) switch 53, a signal representative of the vehicle speed VSP from the vehicle speed sensor 63, a signal from the air conditioner switch 65, a signal from the brake switch 66, a signal from the idle switch 67, a signal representative of the engine speed Ne from the speed sensor 62 and a signal representative of the steering angle β from the angle sensor 75, at step S202, determinations are made at steps S203 through S208. Specifically, the engine speed Ne is compared to a specified critical speed of, for instance, 500 rpm at step S203. This critical speed is used to conclude that the engine 1 has been warmed up. When the engine speed Ne is less than 500 rpm, this indicates that the engine 1 has not yet been warmed up, then, the flow chart logic orders return to restart the sequence routine from step S201. On the other hand, when the engine speed Ne is equal to or greater than 500 rpm, this indicates that the engine 1 has not yet been warmed up, then, a determination is made at step S204 as to whether the vehicle speed VSP is 0 (zero). When the vehicle speed VSP is not 0 (zero), i.e. the vehicle is traveling, then, the flow chart logic orders return to restart the sequence routine from step S201. On the other hand, when the vehicle speed VSP is 0 (zero), this indicates that the vehicle is stopped, then, a determination is made at step S205 as to whether there is an air conditioner signal $S_{air}$ from the air conditioner switch 65. When an air conditioner signal $S_{air}$ is detected, i.e. the air conditioner switch 65 is on, and hence the air conditioner is on, then, the flow chart logic orders return to restart the sequence routine from step S201. On other hand, when no air conditioner signal $S_{air}$ is detected, this indicates that the air conditioner is off, then, a determination is made at step S206 as to whether there is a brake signal $S_{brk}$ from the brake switch 66. When no brake signal $S_{brk}$ is detected, i.e., no brakes are being applied on the vehicle, then, the flow chart logic orders return to restart the sequence routine from step S201. On the other hand, when a brake signal $S_{brk}$ is detected, this indicates that the vehicle is braked, then, a determination is made at step S207 as to whether there is an idle signal $S_{idl}$ from the idle switch 67. When no idle signal $S_{idl}$ is detected, i.e. the throttle valve 16 remain open, then, the flow chart logic orders return to restart the sequence routine from step S201. On the other hand, when an idle signal $S_{idl}$ is detected, this indicates that throttle valve 16 is closed, then, a determination is made at step S208 as to whether there is a steering signal $S_{str}$ from the power steering (PST) switch 53. When a steering signal $S_{str}$ is detected, the state of the failure flag $F_{PST}$ having been set up or reset down in the sequence routine of detection of an operational failure of the power steering (PST) switch 53 is examined at step S209. When the failure flag $F_{PST}$ is down, this indicates that the power steering (PST) switch 53, and hence the hydraulically controlled power steering system, operates normally, then, the flow chart logic orders return to restart the sequence routine from step S201. On the other hand, if the failure flag $F_{PST}$ is up, then, a determination is made at step S210 as to whether the steering angle β is 0 (zero).

In this instance, in the event that a steering signal $S_{str}$ is generated, the generation of the steering signal $S_{str}$ results from an operational failure of the power steering (PST) switch 53, when the condition, for example, the steering angle β is 0 (zero) is satisfied, the pressure provided by the power cylinder 35 is regarded as being low. For this reason, a specified critical value or threshold value α for examining a failure of the idle speed control system is increased with the intention of giving priority to the diagnosis of failure operation of the idle speed control executed at the function block 70. The condition for execution of a failure of the idle speed control system may be that steering torque is 0 (zero)

or that the vehicle speed VSP remains higher than 60 km/h for more than a specified time period. Accordingly, when the steering angle β is 0 (zero), the specified critical value or threshold value α for examining a failure of the idle speed control system is changed by an increment of Δα at step S211.

Subsequently, after setting a target engine speed, namely an target idle speed Neo, according to an engine operating condition at step S212, the difference ΔNe of the engine speed Ne detected by the speed sensor 62 from the idle speed Neo is calculated at step S213. The speed difference ΔNe is compared to the threshold value α at step S214. When the speed difference ΔNe is between limits of α and −α, the flow chart logic terminates the sequence routine. On the other hand, when the speed difference αNe is out of the limits of α and −α after changing the timer count T2 by increment of 1 (one) at step S215, the timer count T2 is compared to a specified critical time T2A of, for example, 10 seconds at step S216. When the timer count T2 is less than the critical time T2A of 10 seconds, the flow chart logic orders return to restart the sequence routine from step S202. However, when the timer count T2 reaches the critical time T2A of 10 seconds, this indicates that the speed difference ΔNe remains out of the limits of α and −α for a specified time period of 10 seconds, then, it is, concluded that the idle speed control system encounters a failure, and a failure flag $F_{IDL}$ is set up to a state of "1" which indicates that an operational failure of the power steering (PST) switch 53 at step S217. Finally, the indicator 61 is actuated to provide an indication of an operational failure of the idle speed control system at step S218 and the flow chart logic terminates the sequence routine.

The failure flags $F_{PST}$ and $F_{IDL}$ are referred to for diagnosis in a service shop. The diagnosis of operation of the hydraulically controlled power steering system is performed by a tester connected to the control unit 60.

In the operation of the failure detection system of the rack and pinion type of hydraulically controlled power steering system of the invention, while the engine runs idle with the throttle valve 16 remaining closed, i.e. while the idle switch 67 remains turned on, the control unit 60, in particular the idle speed control function block 70, executes the feedback control of the idle speed control system so that the engine 1 attains a target idle speed Neo. Further, when the conditions that the engine has been warmed up, that the vehicle speed VSP is 0 (zero), that the air conditioner is off, that the vehicle is braked, that the throttle valve 16 is in the closed position, and that the power steering (PST) switch 53 is off are satisfied all at once, the diagnosis of operation of the idle speed control system is executed. However, in the event where the condition concerning the power steering (PST) switch 53 and at least any one of the remaining conditions are unsatisfied, the diagnosis of operation of the idle speed control system is interrupted.

In the hydraulically controlled power steering system, the power steering pump 40 is belt driven by the engine 1. While the steering wheel 26 remains not operated and the right and left front wheels 34R and 34L are directed straight ahead, the control valve 42 brings its high pressure slots 47 and low pressure slots 48 into communication with each other to allow pressurized oil from the power steering pump 40 to pass through from the high pressure slots 47 into the low pressure slots 48. As a result, there is not a rise in hydraulic oil pressure in the hydraulic control circuit 41 having the control valve 42 between the power cylinder 35 and the power steering pump 40, so that the hydraulically controlled power steering system does not provide the power assist.

On the other hand, when the steering wheel 36 is turned, the rack and pinion steering gear causes movement of the rack 31, either the right or left, to transfer the motion of the steering wheel 26 to the right and left front wheels 34R and 34L. At this time, the control valve 42 installed to the steering shaft 27 turns its valve body 43 in the valve housing 45 to bring the high pressure slots 47 into communication with either the holes 46L of the right turn power chamber 38R, respectively or the holes 46R of the left turn power chamber 38L, respectively, and simultaneously the low pressure slots 48 into communication with either the holes 46R of the left turn power chamber 38L, respectively or the holes 46L of the right turn power chamber 38R, respectively. In this state, the hydraulic control circuit 41 with the control valve 42 is partly shut off between the power steering pump 40 and either one of the power chambers 38R and 38L of the power cylinder 38, providing a rise in hydraulic oil pressure in the part of the hydraulic control circuit 41 to a level higher than a specified level. This causes, on one hand, a flow of hydraulic oil from the power steering pump 40 into the one power chamber of the power cylinder 35 through the control valve 42 and, on the other hand, oil discharge from the other power chamber of the power cylinder 35 into the power steering pump 40 through the low pressure slots 48 of the control valve 42. In this way, the power cylinder 35 provides for the rack and pinion steering gear the power assist, assisting the driver to turn the steering wheel 26.

A rise in hydraulic oil pressure in the part of the hydraulic control circuit 41 between the power steering pump 40 and either one of the power chambers 38R and 38L of the power cylinder 38 to a level higher than a specified level causes the power steering (PST) switch 53 to turn on, providing a signal indicative of assisting the steering gear, i.e. the operation of the power cylinder 35.

With the hydraulically controlled power steering system of the embodiment described above, in the event where the vehicle is traveling at a speed VSP higher than a specified critical speed VSPO of, for example, 60 km/h, the power steering (PST) switch 53 remains turned on over a specified time period of, for example, 60 seconds, because it can not occur on practical driving conditions that the power cylinder 35 is actuated and provides the power assist for the time period under that condition, it is concluded that the power steering (PST) switch 53 encounters a somewhat serious failure such as a lock on movement of the pressure level plate 55 due, for example, to foreign particles sticking to the inner wall surface of the cylinder 54. Accordingly, the failure detection system avoids wrong detections such that, though the power cylinder 35 is practically not actuated, an indication of the power assist is provided by means of a signal accidentally generated by the power steering (PST) switch 53, which assures an accurate indication that the power steering (PST) switch 53 encounters operational failures. Further, as the power cylinder 35 is used to provide the power assist for the hydraulically controlled power steering system, the condition of a rise in hydraulic oil pressure necessary to practically assist the hydraulically controlled power steering system is accurately set, which makes it more accurate to detect an operational failure of the power steering (PST) switch 53. In particular, the operational failure is detected based on the fact that, while the vehicle speed VSP is higher than a specified critical speed VSPO, the power steering (PST) switch 53 remains turned on for a specified time period, so that the failure detection of the power steering (PST) switch 53 has no necessary of making the direct utilization of an angular velocity of the steering wheel 26 and/or the torque of rotation of the steering shaft 27 and is realized by the utilization of vehicle speed VSP. The failure detection of the power steering (PST) switch 53 is executed at satisfaction of the condition that the temperature of engine cooling water THW is higher than a specified critical temperature THW0, so that wrong detection of the operational failure of the power cylinder 35 due to an increase in viscosity of hydraulic oil which is often caused, for example, while the engine 1 is cold are avoided and that accurate failure detection is assured.

In addition, the diagnosis of operation of the idle speed control system is interrupted when the power steering (PST) switch 53 remains turned on. In the event where, although the power steering (PST) switch 53 has a malfunction, there is a rise in hydraulic pressure caused by the power cylinder 35 and there is, however, a signal generated by the power steering (PST) switch 53, there is a fear that the diagnosis of operation of the idle speed control system is interrupted until the cause of failure is cleared away. However, in the failure detection system of the above embodiment, while it is indicated that the power steering (PST) switch 53 encounters a failure, if there is a signal generated by the power steering (PST) switch 53 even though the steering angle of 0 (zero) is detected, then, the diagnosis of operation of the idle speed control system is executed on condition that the power cylinder 35 remains inactive.

Figure 9:
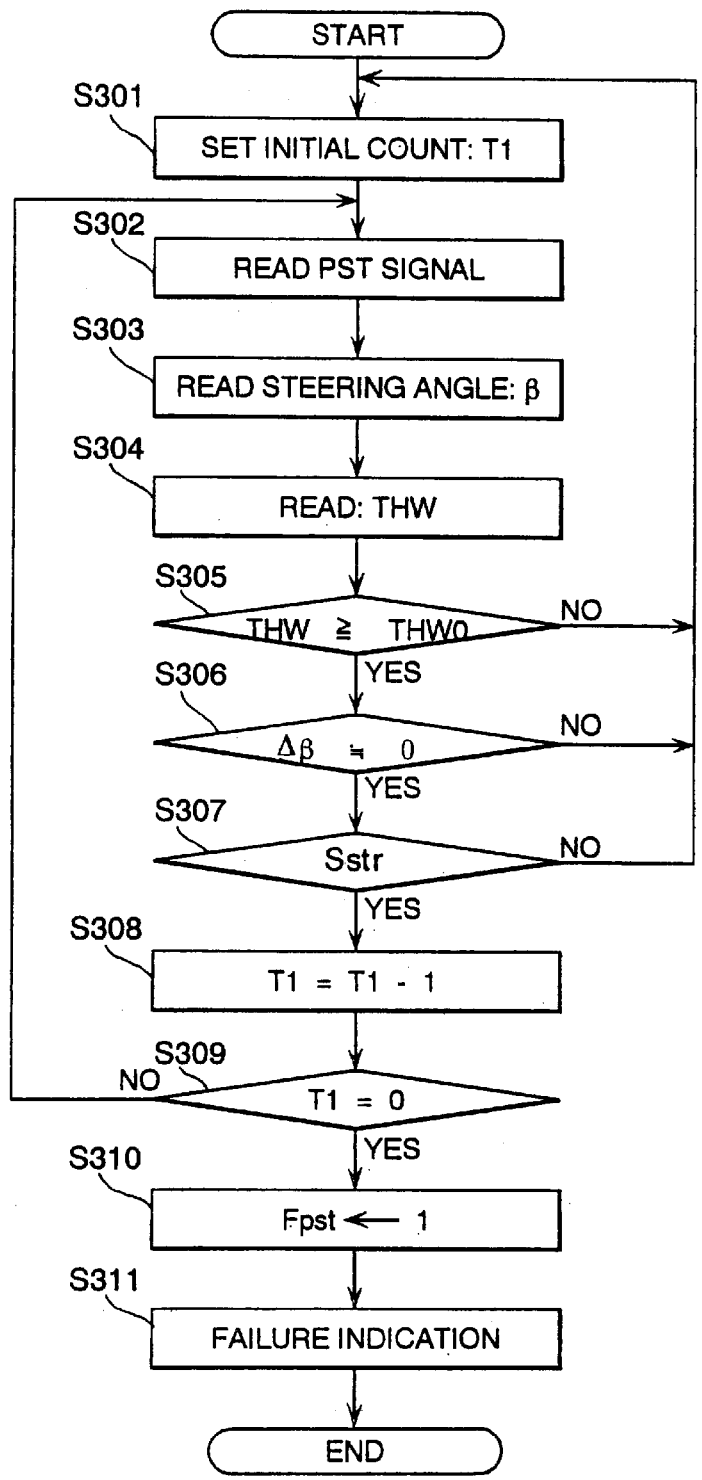
FIG. 9 is a flow chart illustrating a variation of the sequence routine of the diagnosis of an operational failure of the idle speed control system.

FIG. 9 shows a flow chart illustrating a variation of the sequence routine of detection of an operational failure of the power steering (PST) switch 53 shown in FIG. 2. In the sequence routine shown in FIG. 9, it is concluded that the power steering (PST) switch 53 encounters a failure in the event where the power cylinder 35 provides no power assist for the rack and pinion steering gear due to no turn of the steering wheel 26, the power steering (PST) switch 53 remains turned on for a specified time period.

As shown in FIG. 9, when the flow chart logic commences and control proceeds directly to a function block at step S301 where a count-down timer is initialized to reset an initial time T1 to, for instance, 60 seconds. Subsequently, signals from the power steering (PST) switch 53, the angular sensor 75 and the temperature sensor 64 at steps S302, S303 and S304 are read, respectively. At step S303, the steering angle β is differentiated by time to obtain an angular velocity Δβ. Determinations are subsequently made at steps S305, S306 and S307 as to whether the condition of execution of the sequence routine of detection of an operational failure of the power steering (PST) switch 53 is satisfied. Specifically, a determination is made as to whether the temperature of engine cooling water THW is higher than a specified critical temperature THW0 at step S305, whether the angular velocity Δβ is approximately 0 (zero) at step S306 and whether there is a steering signal $S_{str}$ from the power steering (PST) switch 53 at step S307. When the answer to any one of the determinations made at steps S305 through S307 is negative, this indicates that the condition of execution of the sequence routine of detection of an operational failure of the power steering (PST) switch 53 is not satisfied, then, the flow chart logic orders return to restart the sequence routine from step S301. On the other hand, when the answers to the respective determinations made at steps S305 through S307 are affirmative, this indicates that the condition of execution of the sequence routine of detection of an operational failure of the power steering (PST) switch 53 is satisfied, then, after counting down the timer count T1 by 1 (one) at step S308, another determination is made at step S309 as to whether the timer count T1 is 0 (zero). When the timer count T1 indicates 0 (zero), the power steering (PST) switch 53 is regarded as certainly encountering a failure. Then, after setting a failure flag $F_{PST}$ to a state of "1" which indicates an operational failure of the power steering (PST) switch 53 at step S310, the indicator 61 is actuated to provide an indication of the operational failure of the power steering (PST) switch 53, and hence an operational failure of the hydraulically controlled power steering system, at step S311, and the flow chart logic terminates the sequence routine. On the other hand, when the timer count T1 does not indicates 0 (zero), the flow chart logic orders return to restart the sequence routine from step S302.

In the embodiment described above, in the event where, while there is no change in angular velocity Δβ of the steering wheel 26, the power steering (PST) switch 53 remains turned on over the specified time period, because it can not occur on practical driving conditions that the power cylinder 35 is actuated and provides the power assist with the steering wheel 26 remaining not operated, it is concluded that the power steering (PST) switch 53 encounters a failure. Accordingly, the failure detection system assures accurate detection that the power steering (PST) switch 53 encounters an operational failure.

Figure 10:
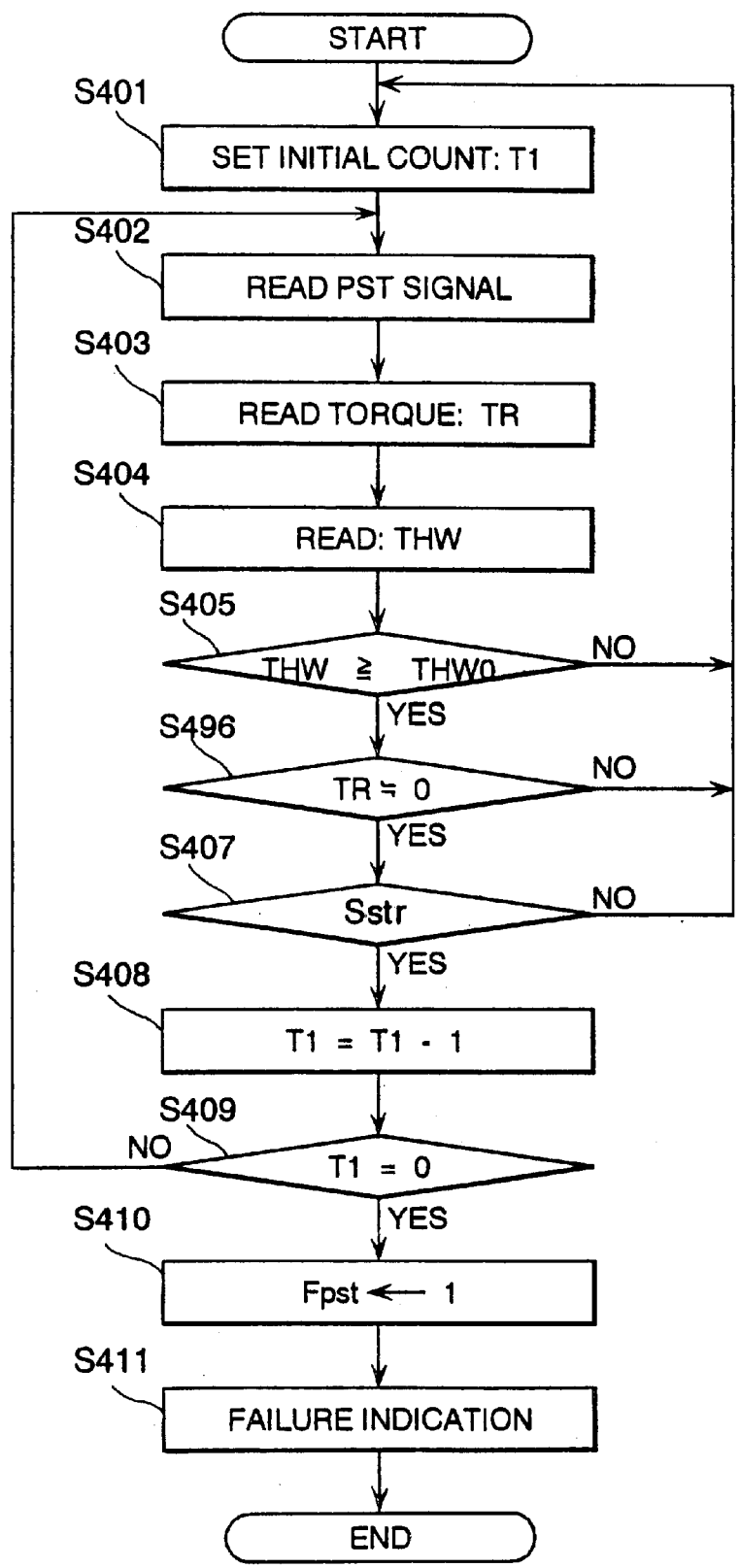
FIG. 10 is a flow chart illustrating another variation of the sequence routine of the diagnosis of an operational failure of the idle speed control system.

FIG. 10 shows a flow chart illustrating another variation of the sequence routine of detection of an operational failure of the power steering (PST) switch 53 shown in FIG. 2. In the sequence routine shown in FIG. 10, it is concluded that the power steering (PST) switch 53 encounters a failure in the event where, while the steering shaft 27 is subjected to no torque of rotation, the power steering (PST) switch 53 remains turned on for a specified time period.

As shown in FIG. 10, when the flow chart logic commences and control proceeds directly to a function block at step S401 where a count-down timer is initialized to reset an initial time T1 to, for instance, 60 seconds. Subsequently, signals from the power steering (PST) switch 53, the torque sensor 77 and the temperature sensor 64 at steps S402, S403 and S404 are read, respectively. Determinations are subsequently made at steps S405, S406 and S407 as to whether the condition of execution of the sequence routine of detection of an operational failure of the power steering (PST) switch 53 is satisfied. Specifically, a determination is made as to whether the temperature of engine cooling water THW is higher than a specified critical temperature THW0 at step S405, whether the rotational torque TR is approximately 0 (zero) at step S406 and whether there is a steering signal $S_{str}$ from the power steering (PST) switch 53 at step S407. When the answer to any one of the determinations made at steps S405 through S407 is negative, this indicates that the condition of execution of the sequence routine of detection of an operational failure of the power steering (PST) switch 53 is not satisfied, then, the flow chart logic orders return to restart the sequence routine from step S401. On the other hand, when the answers to the respective determinations made at steps S405 through S407 are all affirmative, this indicates that the condition of execution of the sequence routine of detection of an operational failure of the power steering (PST) switch 53 is satisfied, then, after counting down the timer count T1 by 1 (one) at step S408, another determination is made at step S409 as to whether the timer count T1 is 0 (zero). When the timer count T1 indicates 0 (zero), the power steering (PST) switch 53 is regarded as certainly encountering a failure. Then, after setting a failure flag $F_{PST}$ to a state of "1" which indicates an operational failure of the power steering (PST) switch 53 at step S410, the indicator 61 is actuated to provide an indication of the operational failure of the power steering (PST) switch 53, and hence an operational failure of the hydraulically controlled power steering system, at step S411, and the flow chart logic terminates the sequence routine. On the other hand, when the timer count T1 does not indicate 0 (zero), the flow chart logic orders return to restart the sequence routine from step S402.

In the embodiment described above, in the event where there is no change in rotational torque of the steering shaft 27, the power steering (PST) switch 53 remains turned on over the specified time period, because it can not occur on practical driving conditions that the power cylinder 35 is actuated and provides the power assist with the steering shaft 27 remaining subjected to no rotational torque, it is concluded that the power steering (PST) switch 53 encounters a failure. Accordingly, the failure detection system assures accurate detection that the power steering (PST) switch 53 encounters an operational failure.

In the hydraulically controlled power steering systems according to the respective embodiments, the power steering (PST) switch 53 may take any known type of pressure sensor. Further, the hydraulically controlled power steering system may incorporate the power cylinder 35 so as to assist movement of a movable element other than the rack 31 of the rack and pinion steering gear and may be of a type having a steering gear other than the rack and pinion steering gear.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A failure detection system for detecting an operational failure of a hydraulically controlled power steering system including power assisting means for assisting the driver in manipulating front wheels of the vehicle by utilizing hydraulic pressure applied to a steering gear connected to the front wheels through a steering linkage, said hydraulic pressure being increased in response to an increase in resistance against manipulation of the steering gear, said failure detecting system comprising:
    vehicle speed detecting means for detecting a vehicle speed;
    pressure detecting means for detecting a specified level of said hydraulic pressure provided by said power assisting means; and
    failure judging means for judging said pressure detecting means to be at failure in operation when, while said vehicle speed remains higher than a specified speed for a specified time period and, said pressure detecting means detects said specified level of said hydraulic pressure.

2. A failure detection system for detecting an operational failure of a hydraulically controlled power steering system as defined in claim 1, wherein said pressure detecting means comprises an elastic member deformable in accordance with a rise in said hydraulic pressure.

3. A failure detection system for detecting an operational failure of a hydraulically controlled power steering system as defined in claim 1, wherein said power assisting means provides for said steering gear a power assist in response to a change in turning angle of said steering wheel.

4. A failure detection system for detecting an operational failure of a hydraulically controlled power steering system as defined in claim 1, wherein said failure judging means executes judgement of a failure in operation of said pressure detecting means on condition that a temperature of engine cooling water is higher than a specified temperature.

5. A failure detection system for detecting an operational failure of a hydraulically controlled power steering system as defined in claim 2, wherein said power assisting means provides for said steering gear a power assist in response to a change in turning angle of said steering wheel.

6. A failure detection system for detecting an operational failure of a hydraulically controlled power steering system as defined in claim 2, wherein said failure judging means determines a failure in operation of said pressure detecting means on condition that a temperature of engine cooling water is higher than a specified temperature.

7. A failure detection system for detecting an operational failure of a hydraulically controlled power steering system as defined in claim 3, wherein said failure judging means executes judgement of a failure in operation of said pressure detecting means on condition that a temperature of engine cooling water is higher than a specified temperature.

8. A failure detection system for detecting an operational failure of a hydraulically controlled power steering system of a vehicle equipped with idle speed control means for controlling an engine speed while an engine runs idle, said hydraulically controlled power steering system including power assisting means for assisting the driver in manipulating a steering wheel by utilizing hydraulic pressure applied to a steering gear connected to the front wheels through a steering linkage and said hydraulic pressure being generated by a pressure generator driven by said engine and rising in level in response to an increase in resistance against manipulation of the steering gear, said failure detecting system comprising:
    vehicle speed detecting means for detecting a vehicle speed;
    engine speed detecting means for detecting an engine speed;
    pressure detecting means for detecting a specified level of said hydraulic pressure provided by said power assisting means; and
    failure judging means for determining if said pressure detecting means are at failure in operation when said vehicle speed remains higher than a specified speed for a specified time period, said pressure detecting means detects said specified level of said hydraulic pressure, and executing diagnosis of an operational failure of said idle speed control system by utilizing a threshold value relating to engine speed when judging a failure of said pressure detecting means, said vehicle speed remains higher than a specified speed for a specified time period.

9. A failure detection system for detecting an operational failure of a hydraulically controlled power steering system as defined in claim 8, wherein said pressure detecting means comprises an elastic member deformable in accordance with a rise in said hydraulic pressure.

10. A failure detection system for detecting an operational failure of a hydraulically controlled power steering system as defined in claim 8, wherein said power assisting means provides for said steering gear a power assist in response to a change in turning angle of said steering wheel.

11. A failure detection system for detecting an operational failure of a hydraulically controlled power steering system as defined in claim 8, wherein said threshold value is increased when a prescribed condition is satisfied.

12. A failure detection system for detecting an operational failure of a hydraulically controlled power steering system as defined in claim 11, wherein said prescribed condition is specified that a steering angle of said steering wheel is 0 (zero).

13. A failure detection system for detecting an operational failure of a hydraulically controlled power steering system as defined in claim 11, wherein said prescribed condition is specified that steering torque of said steering wheel remains 0 (zero).

14. A failure detection system for detecting an operational failure of a hydraulically controlled power steering system as defined in claim 11, wherein said prescribed condition is specified that said vehicle speed remains higher than a specified speed for a specified time period.

15. A failure detection system for detecting an operational failure of a hydraulically controlled power steering system including power assisting means for assisting the driver in manipulating front wheels of the vehicle by utilizing hydraulic pressure applied to a steering gear connected to the front wheels through a steering linkage, said hydraulic pressure being increased in response to a change in steering angle of the steering wheel, said failure detecting system comprising:

pressure detecting means for detecting a specified level of said hydraulic pressure provided by said power assisting means;

angular velocity detecting means for detecting an angular velocity of said steering wheel; and failure judging means for calculating a change in said angular velocity and judging said pressure detecting means to be at failure in operation when, while said change in said angular velocity remains zero, said pressure detecting means detects said hydraulic pressure remaining higher than said specified level for a specified time period.

16. A failure detection system for detecting an operational failure of a hydraulically controlled power steering system as defined in claim 15, wherein said pressure detecting means comprises an elastically member deformable in accordance with a rise in said hydraulic pressure.

17. A failure detection system for detecting an operational failure of a hydraulically controlled power steering system as defined in claim 15, wherein said power assisting means provides for said steering gear a power assist in response to a change in turning angle of said steering wheel.

18. A failure detection system for detecting an operational failure of a hydraulically controlled power steering system as defined in claim 15, wherein said failure judging means determines a failure in operation of said pressure detecting means on condition that a temperature of engine cooling water is higher than a specified temperature.

19. A failure detection system for detecting an operational failure of a hydraulically controlled power steering system including power assisting means for assisting the driver in manipulating front wheels of the vehicle by utilizing hydraulic pressure applied to a steering gear connected to the front wheels through a steering linkage, said hydraulic pressure being increased in response to a change in steering angle of the steering wheel, said failure detecting system comprising:

pressure detecting means for detecting a specified level of said hydraulic pressure provided by said power assisting means;

steering torque detecting means for detecting steering torque of said steering wheel; and failure judging means for determining said pressure detecting means to be at failure in operation when said steering torque is detected, said pressure detecting means detects said hydraulic pressure remaining higher than said specified level for a specified time period.

20. A failure detection system for detecting an operational failure of a hydraulically controlled power steering system as defined in claim 19, wherein said pressure detecting means comprises an elastic member deformable in accordance with a rise in said hydraulic pressure.

21. A failure detection system for detecting an operational failure of a hydraulically controlled power steering system as defined in claim 19, wherein said power assisting means provides for said steering gear a power assist in response to a change in turning angle of said steering wheel.

22. A failure detection system for detecting an operational failure of a hydraulically controlled power steering system as defined in claim 19, wherein said failure judging means determines a failure in operation of said pressure detecting means on condition that a temperature of engine cooling water is higher than a specified temperature.

* * * * *